(12) United States Patent
Clamp et al.

(10) Patent No.: US 10,723,192 B2
(45) Date of Patent: Jul. 28, 2020

(54) AIRBAG PROTECTION SLEEVE

(71) Applicant: RKC Holdings Pty Ltd, Brisbane, Queensland (AU)

(72) Inventors: Richard James Clamp, Scarborough (AU); Leon Hart, Albany Creek (AU)

(73) Assignee: RKC HOLDINGS PTY LTD, Brisbane (AU)

( * ) Notice: Subject to any disclaimer, the term of this patent is extended or adjusted under 35 U.S.C. 154(b) by 92 days.

(21) Appl. No.: 15/766,481

(22) PCT Filed: Oct. 5, 2016

(86) PCT No.: PCT/AU2016/000340
§ 371 (c)(1),
(2) Date: Apr. 6, 2018

(87) PCT Pub. No.: WO2017/059476
PCT Pub. Date: Apr. 13, 2017

(65) Prior Publication Data
US 2018/0281542 A1     Oct. 4, 2018

(30) Foreign Application Priority Data
Oct. 6, 2015   (AU) .............................. 2015904064

(51) Int. Cl.
*B60G 11/58* (2006.01)
*F16F 9/04* (2006.01)
(Continued)

(52) U.S. Cl.
CPC ................ *B60G 11/58* (2013.01); *F16F 9/04* (2013.01); *F16F 9/38* (2013.01); *F16F 13/002* (2013.01);
(Continued)

(58) Field of Classification Search
CPC ... F16F 9/04; F16F 9/38; F16F 13/002; B60G 11/58; B60G 2202/12; B60G 2202/152;
(Continued)

(56) References Cited

U.S. PATENT DOCUMENTS 2,960,333 A  *  11/1960  McGavern, Jr. ...... F16F 9/0445
                                                     267/64.24
3,897,941 A     8/1975   Hirtreiter et al.
(Continued)

FOREIGN PATENT DOCUMENTS

CN      101583819 A    11/2009
CN      203161951 U    8/2013
(Continued)

OTHER PUBLICATIONS

200 Series Land Cruiser Air Suspension—AIRBAG Man Kit CR5051HP, Jan. 20, 2015.*
(Continued)

*Primary Examiner* — Robert A. Siconolfi
*Assistant Examiner* — San M Aung
(74) *Attorney, Agent, or Firm* — Moreno IP Law LLC

(57) ABSTRACT

A coil air spring combination (13) in this case includes a coil (11) and airbag (12) and an airbag protective sleeve (13) fitted over the airbag. The sleeve may be made from an inextensible fabric with tapered elastic ends so that the sleeve can fit over the airbag for installation.

15 Claims, 4 Drawing Sheets

(51) Int. Cl.
*F16F 9/38* (2006.01)
*F16F 13/00* (2006.01)

(52) U.S. Cl.
CPC .... *B60G 2202/12* (2013.01); *B60G 2202/152* (2013.01); *B60G 2206/42* (2013.01)

(58) Field of Classification Search
CPC ... B60G 2206/42; B60R 21/30; B60R 21/201; B60R 21/276
USPC ............. 267/34, 23, 241, 259, 64.11, 64.15; 280/440
See application file for complete search history.

(56) References Cited

U.S. PATENT DOCUMENTS

| | | | |
|---|---|---|---|
| 4,741,517 A * | 5/1988 | Warmuth | F16F 9/38 267/64.24 |
| 4,894,108 A | 1/1990 | Richard et al. | |
| 6,145,879 A | 11/2000 | Lowe et al. | |
| 2008/0265475 A1 * | 10/2008 | Keeney | F16F 9/04 267/64.11 |
| 2016/0178024 A1 | 6/2016 | Lee | |

FOREIGN PATENT DOCUMENTS

| | | | |
|---|---|---|---|
| CN | 203623313 U | 6/2014 | |
| DE | 102006016141 A1 | 10/2007 | |
| JP | 2007218310 A * | 8/2007 | ............... F16F 9/38 |

OTHER PUBLICATIONS

Office Action for Chinese Patent Application No. 201680064184.5 dated Aug. 5, 2019, 18 pages.

* cited by examiner

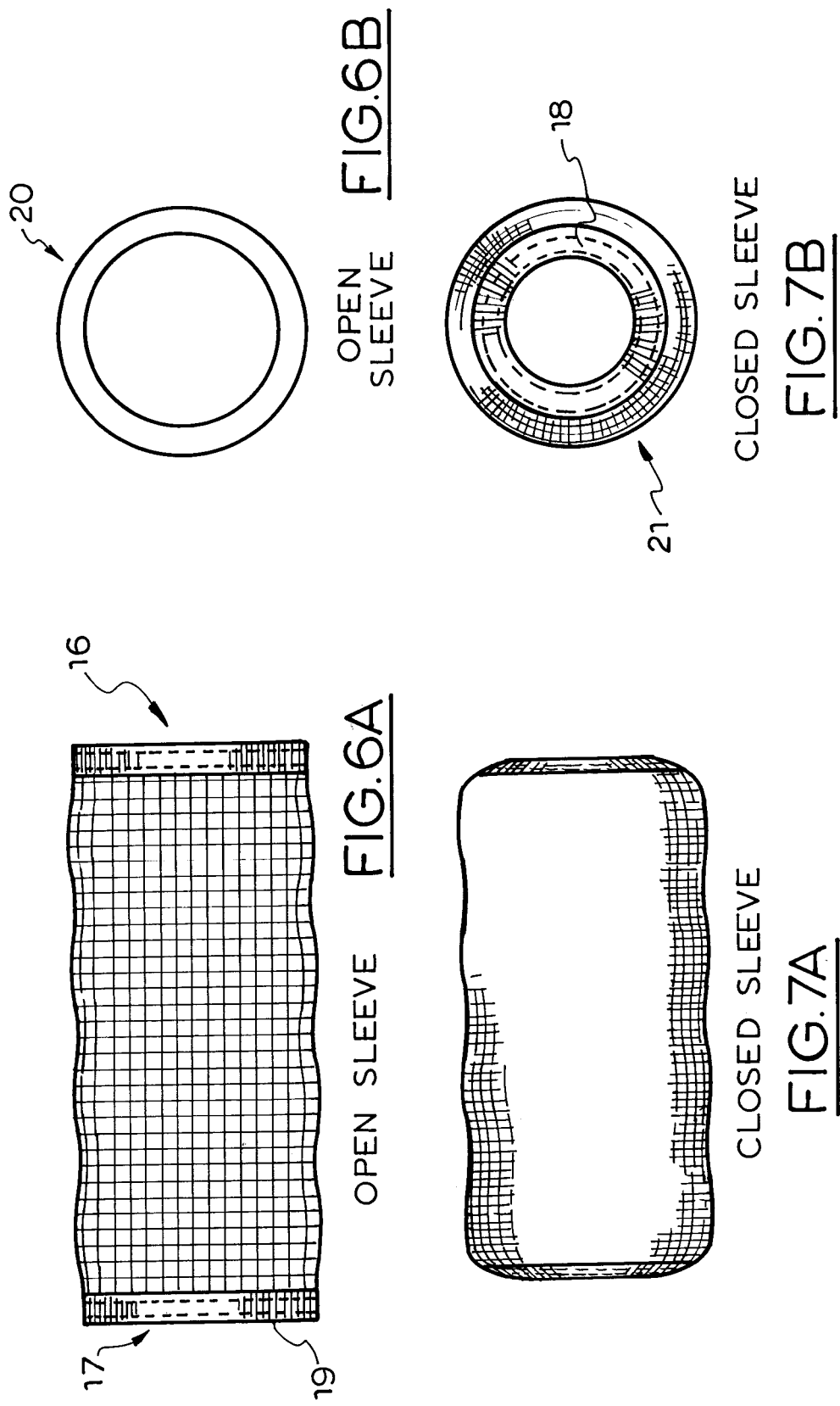

AIRBAG PROTECTION SLEEVE

TECHNICAL FIELD

THIS INVENTION relates to airbag suspensions and in particular but not limited to high pressure coil helper air suspensions.

BACKGROUND

Coil helper air suspensions employ an airbag fitted inside a coil spring. The coil spring is generally fitted closely to the airbag and consequently the airbag is prone to wear from rubbing against the coil spring.

It has been proposed to incorporate some form of protective integral outer cover or layer to protect the airbag from this rubbing by the coil spring. Examples of suspensions with some form of protective layer or insert are in the following patents specifications by country code, the disclosures of which are incorporated herein by reference in their entirety (the disclosure herein is not an admission that any of these are common general knowledge):
CN203623313U, DE102006016141A1, US2016178024A1, U.S. Pat. Nos. 3,897,941A, 4,894,108A, 6,145,879.

OUTLINE

Due to the tight arrangement of the coil spring and airbag, proposals used to date have proved difficult to fit and maintain in the desired fitted position. It is therefore desirable to provide an alternative to present proposals that is easier to fit and that more reliably stays in place.

In one aspect therefore the present invention resides in an airbag protection sleeve comprising an outer wall and opposite ends, at least one end having in use, a wide-to-narrow aspect to aid retention of the sleeve on the airbag. Preferably, the wide to narrow aspect comprises an inwardly directed annular shoulder means closely fitted to a corresponding shoulder of the airbag. Preferably, the wide-to-narrow inwardly directed annular shoulder means comprises at least in part an annular elastic ring. Typically, the outer wall is an endless wall and the ring is an endless ring defining an expandable entrance opening for insertion of the airbag into the sleeve.

In another aspect the at least one end has an opening for insertion of the airbag into the sleeve, the opening having an elastic surround smaller in size than the diameter of the airbag in order to elastically deform about the airbag as the airbag is inserted into the sleeve and upon the airbag being inserted into the sleeve the opening reduces in diameter in juxtaposition to one end of the airbag.

The wall of the airbag can be made of any material but is typically made from a durable fabric. Typically, both ends of the airbag sleeve are open and are similar or the same. Preferably, the airbag protection sleeve is generally cylindrical with narrowed annular elastic marginal end sections.

Typically, a marginal end portion of each open end is elasticised. Typically, each end of the airbag sleeve has a turned over elastic marginal hem secured to the outer wall. Typically, the fabric body is expandable to a cylinder in form. In another form the outer body includes axially extending ribs or crease marks so that the sleeve may be stored flat.

In a further aspect there is provided a method of manufacture of an airbag sleeve comprising the steps of:

1. providing a seamless tube having opposed ends and the tube being slightly larger than the airbag;
2. taking at least one of the ends of the tube and forming therefrom, by a suitable process, a narrow expandable and retractable opening for insertion of the airbag to an operative position just inside the opening.

In a further step the opposite end may be made with the same or similar opening. The opening may be formed by adding an elastic section to the tube. The elastic section may be of any suitable elastic with the expansion limited by the tube diameter. The tube diameter is typically selected for close fit of the sleeve between an airbag and a coil spring in a suspension. In a further step the elastic section is axially tapered.

In still another aspect there is provided, in a vehicle suspension, a coil spring, an airbag mounted inside the spring and a sleeve around the airbag between the airbag and the spring, the sleeve comprising an outer wall and opposite ends, at least one end having in use, a wide-to-narrow aspect to aid retention of the sleeve on the airbag.

BRIEF DESCRIPTION OF THE DRAWINGS

In order that the present invention may be more readily understood and be put into practical effect, reference will now be made to the accompanying drawings which illustrate a preferred embodiment of the invention wherein:

FIGS. 6(a) and 6(b) serve to illustrate in schematic form how a sleeve is stretched to an open position to receive an airbag;

FIGS. 7(a) and 7(b) show the sleeve of FIGS. 6(a) and 6(b) in its relaxed or closed position once it has been positioned over an airbag and prior to being stretched or prior to being stretched to the position illustrated in FIG. 6(a) or 6(b)

METHOD OF PERFORMANCE

Figure 1:
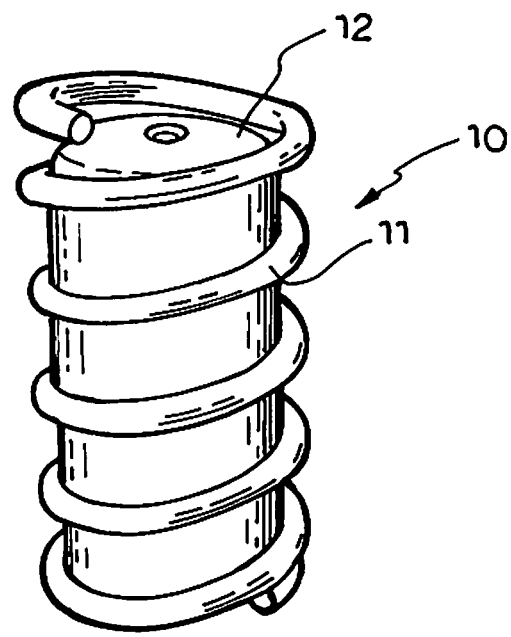
FIG. 1 shows the general environment of use of the present invention showing an airbag located inside a coil spring. The airbag does not have a protective sleeve.

Referring to the drawings and initially to FIG. 1 there is illustrated an airbag coil spring combination 10 comprising a coil 11 and an airbag 12 fitted inside the coil. As can be seen in FIG. 1 the airbag is quite a tight fit inside the coil. As the coil moves relative to the airbag the coil is prone to rub on the airbag.

Figure 2:
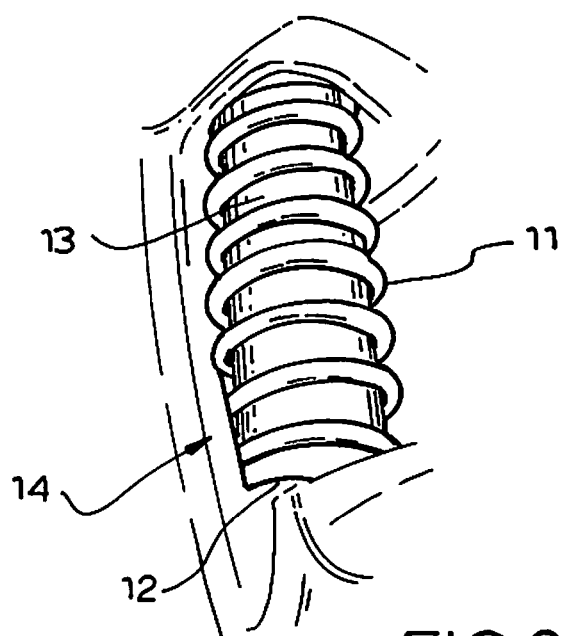
FIG. 2 is a drawing showing in shadow various parts of a suspension with a coil spring fitted with an airbag and the airbag being fitted with a protective sleeve according to the present invention.

In order to avoid wear, as illustrated in FIG. 2, a coil air spring combination in this case includes a coil 11 and airbag 12 and an airbag protective sleeve 13 fitted over the airbag. This arrangement is in accordance with the present invention. Other parts of the vehicle and the suspension are shown in shadow at 14.

As the airbag has to be inserted into the coil as a fairly close fit, the present sleeve wraps over the top of the airbag and over the bottom of the airbag so that effectively the sleeve forms a lead in and does not interfere with the close fit of the airbag relative to the spring. The sleeve has at each end an inwardly directed annular shoulder means closely fitted to a corresponding shoulder of the airbag.

Figure 3:
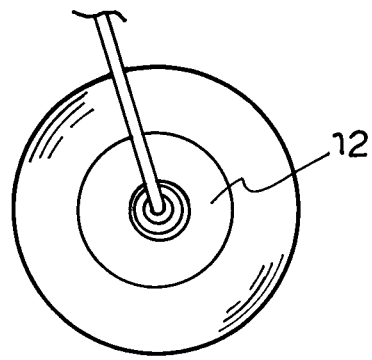
FIGS. 3-5 are schematic top, sectional and side views of an airbag fitted with a protective sleeve.
Figure 4:
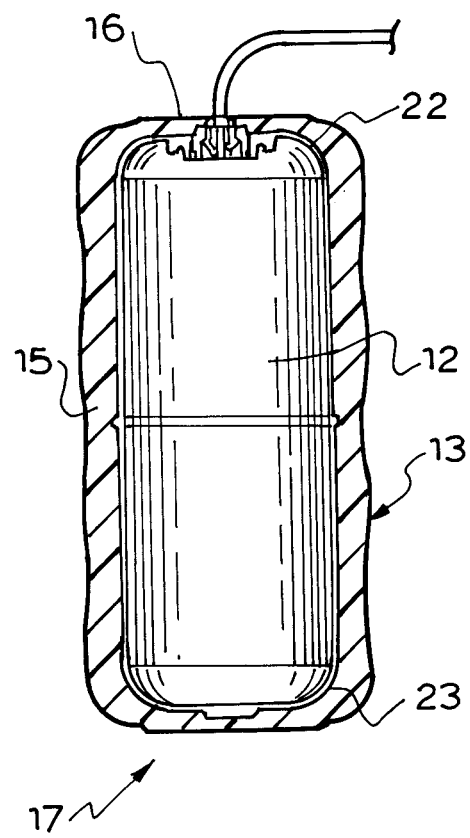
Figure 5:
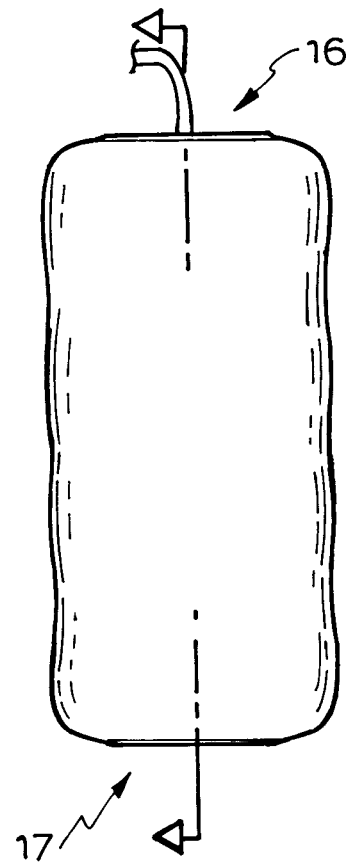
Figure 8:
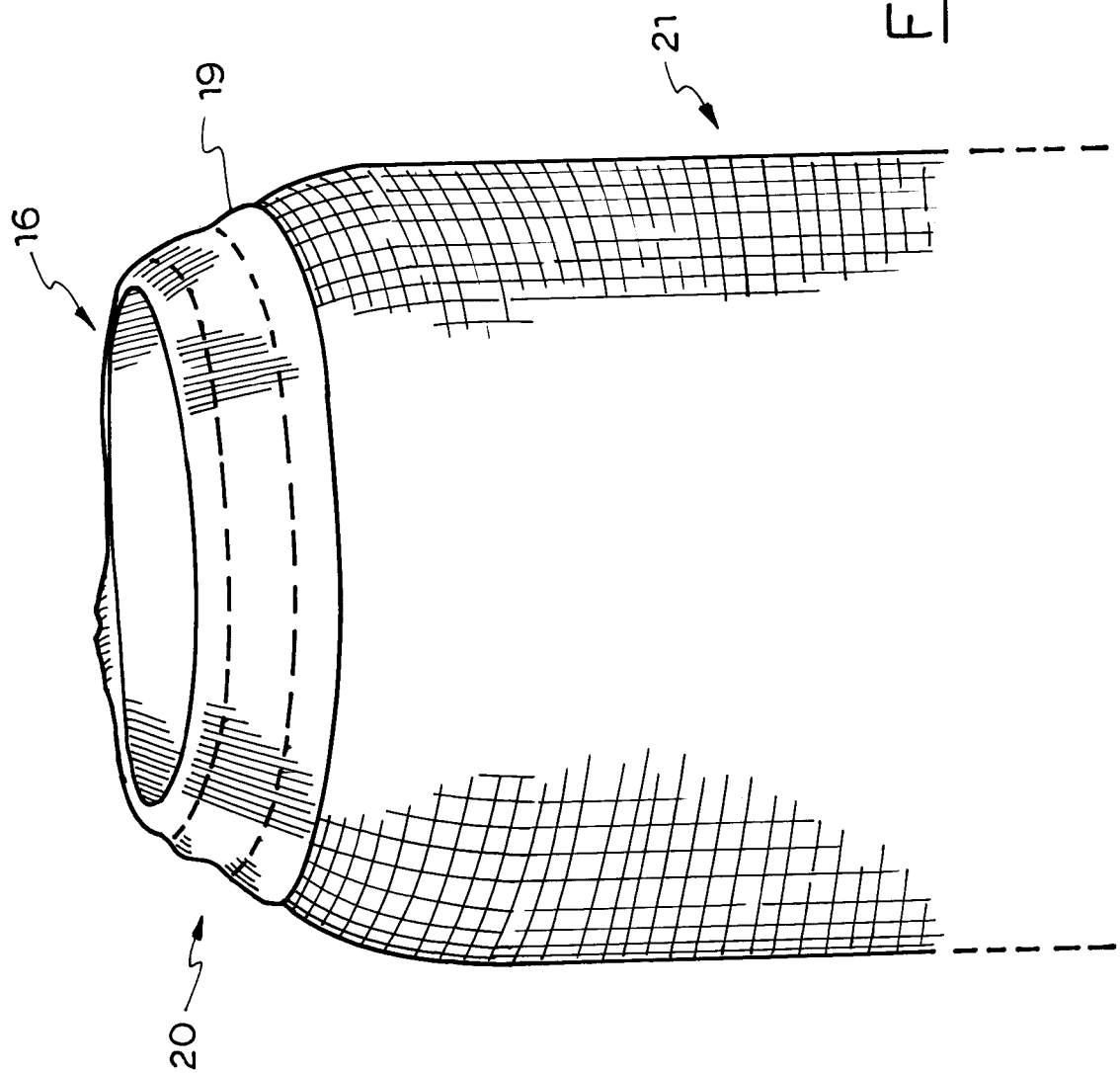
FIG. 8 is a drawing illustrating one end of a protective sleeve, the other end end being the same showing the end in its relaxed unexpanded position.

This means that the sleeve may be made from an inextensible fabric but may be made to have a fairly sloppy fit around the sides of the airbag so as to not restrict in any way airbag expansion but to reach across and wrap over the opposite ends of the airbag. This arrangement is illustrated in FIGS. 3 through 5 where an airbag 12 is shown located inside a protective sleeve 13 the protective sleeve has a side wall 15 and opposite open ends 16 and 17. FIG. 4 shows a thick wall version. FIGS. 6 and 8 are thin wall versions.

As shown more clearly in FIGS. 6(a) and 7(b) the openings 16 and 17 have a marginal section 18, 19 which is an elasticised region or ring adapted to be stretchable between an open position as illustrated at 20 in FIG. 6(b) and the closed position illustrated at 21 in FIG. 7(b). The position of the sleeve 13 in FIGS. 3 through 5 may be the position illustrated in FIG. 7(b) or slightly larger depending on the relative dimensions of the airbag and sleeve but it is suffice to say that the elasticised section of the opening draws the sleeve marginally to a greater or lesser degree around the top peripheral shoulder 22 or the bottom shoulder 23 of the airbag 12 thus wrapping the whole of the airbag as illustrated.

It should be noted that the extent to which the elastic ring reaches radially across the end of the airbag need only be a very small overlap with the airbag or can close practically to a small opening. Each end of the sleeve may be different with the stretch entrance opening being at one end. Further, different sized air bags will have matching sized sleeves. The sleeve is manufactured using a polyester based woven seamless tube with sewn nylon elastic ends giving a tapered feature as shown in FIG. 8. The taper is formed by folding over a marginal section of elastic and then stitching this to the tube. The polyester based sleeve material was chosen due to being compatible with the polyurethane based airbag bellows material, offering suitable containment resistance without separating or shearing and not presenting any adverse breakdown properties. The polyester based woven tube is offered in specific diameters, cut to specified lengths to suit the airbag bellows sizes, and the nylon elastic ends sewn on with nylon thread to finish the cut ends and offer the tapered shoulder feature.

Using practical testing the sleeve diameter is selected at a 10% diameter increase of the airbag bellows listed diameter. This diameter has been tested to allow for fitment of the airbag bellows into the sleeve, fitment of this combination into the given installation and allowance for the airbag bellows and sleeve combination to expand into the coil spring gap. The polyester based woven seamless tube could be substituted with materials of similar properties. Aramid synthetic materials have similar properties available and may offer a suitable alternative. Canvas based natural materials also present similar requirements although would likely be more susceptible to contamination and accelerated degradation. Similarly, the nylon elastic ends could be substituted for materials with similar properties.

The sleeve design could be altered to achieve comparable airbag bellows containment. The airbag sleeve tube design can be considered with a more open weave or constructed with a mesh or sewn webbed strap design to suitably contain the airbag bellows. Similarly, the tapered airbag sleeve ends could be achieved with a one piece formed tapered material design or sewn in a pleated configuration to achieve the tapers, however this more rigid taper design would increase the difficulty of airbag bellows fitment into the sleeve. An adjustable tapered orifice could be achieved via a drawstring or tie configuration, but this would require further installation processes.

The current polyester based woven seamless tube in updated diameters with nylon sewn nylon elastic is the best method for application of airbag protection Sleeve to contain the airbag to allow increased pressure while offering secondary external layer of protection.

Thus in terms of industrial applicability the sleeve may be made from a suitable material that provides increased resistance to higher temperatures from exhaust, protects the airbag from rubbing by the coil and the sleeves may be made so that they are easily replaceable using the end opening arrangements as illustrated in the present invention.

Whilst the above has been given by way of illustrative example many variations and modifications will be apparent to those skilled in the art without departing from the broad ambit and scope of the invention as set out in the appended claims.

The invention claimed is:

1. An airbag protection sleeve comprising an outer wall and opposite ends, at least one end having in use, a wide-to-narrow aspect to aid retention of the sleeve on the airbag, wherein the airbag has a diameter and at least one end of the sleeve has an opening for insertion of the airbag into the sleeve, the opening having an elastic surround smaller in size than the diameter of the airbag in order to elastically deform about the airbag as the airbag is inserted into the sleeve and upon the airbag being inserted into the sleeve the opening reduces in diameter in juxtaposition to one end of the airbag, and
wherein the wide-to-narrow aspect comprises an inwardly directed annular shoulder which includes at least in part an annular elastic ring adapted to be closely fitted to a corresponding shoulder of the airbag.

2. An airbag protection sleeve according to claim 1 wherein the airbag has opposite ends and further wherein the outer wall of the airbag protection sleeve is made from a durable fabric and both ends of the airbag sleeve are open and are similarly configured or configured the same.

3. An airbag protection sleeve according to claim 1 wherein the airbag has opposite ends, both ends of the sleeve having an opening for insertion of the airbag into the sleeve though one of the ends, the openings of both ends of the sleeve having an elastic surround smaller in size than the diameter of the airbag in order to elastically deform about the airbag as the airbag is inserted into the sleeve and upon the airbag being inserted into the sleeve, the openings reduce in diameter in juxtaposition to the ends of the airbag both ends of the airbag sleeve are open and are similar or the same.

4. An airbag protection sleeve according to claim 1 wherein the airbag protection sleeve is generally cylindrical with narrowed annular elastic marginal end sections defining openings in opposite ends of the sleeve.

5. An airbag protection sleeve according to claim 1 wherein the outer wall is an endless wall and the ring is an endless ring defining an expandable entrance opening for insertion of the airbag into the sleeve, the entrance opening retracting upon the airbag being inserted into the sleeve.

6. An airbag protection sleeve according to claim 1 wherein the opposite ends of the sleeve are open and a marginal end portion of each open end is elasticized.

7. An airbag protection sleeve according to claim 1 wherein the outer wall includes axially extending ribs or crease marks so that the sleeve may be stored flat.

8. An airbag protection sleeve according to claim 1 wherein the outer wall is a seamless tube and the wide-to-narrow aspect includes an annular elastic section around an entrance opening and the elastic section is axially tapered.

9. A method of manufacture of an airbag sleeve comprising the steps of:
1. providing a seamless tube having opposed ends and the tube being slightly larger than the airbag;
2. taking at least one of the ends of the tube and forming therefrom, by a suitable process, a narrow expandable and retractable opening for insertion of the airbag to an operative position just inside the opening, wherein the opening is formed with an elastic surround smaller in size than a diameter of the airbag in order to elastically deform about the airbag as the airbag is inserted into the sleeve and upon the airbag being inserted into the sleeve the opening reduces in diameter in juxtaposition to one end of the airbag, and
wherein the opening is formed with an inwardly directed annular shoulder which includes at least in part an annular elastic ring adapted to be closely fitted to a corresponding shoulder of the airbag.

10. The method of claim 9 including the step wherein the opposite end is made with the same or similar opening to the said at least one end.

11. The method of claim 9 including the step wherein the opening is formed by adding an elastic section to the tube.

12. The method of claim 9 including the step of forming each opening with an axial taper.

13. In a vehicle suspension, a coil spring, an airbag mounted inside the spring and a sleeve around the airbag between the airbag and the spring, the sleeve comprising an outer wall and opposite ends, at least one end having in use, a wide-to-narrow aspect to aid retention of the sleeve on the airbag,
wherein the airbag has a diameter and at least one end of the sleeve has an opening for insertion of the airbag into the sleeve, the opening having an elastic surround smaller in size than the diameter of the airbag in order to elastically deform about the airbag as the airbag is inserted into the sleeve and upon the airbag being inserted alto the sleeve the opening reduces in diameter in juxtaposition to one end of the airbag, and
wherein the wide-to-narrow aspect comprises an inwardly directed annular shoulder which includes at least in part an annular elastic ring adapted to be closely fitted to a corresponding shoulder of the airbag.

14. In a vehicle suspension according to claim 13 wherein the annular elastic ring is axially tapered.

15. An airbag protection sleeve according to claim 1 wherein the airbag has a sidewall, and opposite ends, the sleeve being expandable from a flat storage position to a substantially cylindrical form with tapered ends, at least one end of the sleeve has an opening for insertion of the airbag into the sleeve, the opening of the at least one end having an elastic surround smaller in size than the diameter of the airbag in order to elastically deform about the airbag as the airbag is inserted into the sleeve and upon the airbag being inserted into the sleeve the opening reduces in diameter in juxtaposition to one end of the airbag so that the sleeve covers the side wall and part of each end of the airbag and further wherein the outer wall of the airbag protection sleeve is made from an endless fabric tube, and wherein each elastic surround is an axially tapered marginal elastic section around an opening in each end of the sleeve.

* * * * *